US006733857B1

United States Patent
Tebbe

(10) Patent No.: US 6,733,857 B1
(45) Date of Patent: *May 11, 2004

(54) REPAIR MATERIAL FOR DAMAGED PAINTED SURFACES

(75) Inventor: Gerold Tebbe, Monte Carlo (MC)

(73) Assignee: Deotexis, Inc., NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/856,452
(22) PCT Filed: Sep. 23, 1999
(86) PCT No.: PCT/EP99/07076
  § 371 (c)(1),
  (2), (4) Date: Jul. 27, 2001
(87) PCT Pub. No.: WO00/31200
  PCT Pub. Date: Jun. 2, 2000

(30) Foreign Application Priority Data

Nov. 23, 1998 (DE) .......................... 198 53 849

(51) Int. Cl.$^7$ ................................. B32G 7/12
(52) U.S. Cl. .................. 428/63; 428/40.1; 428/41.6; 428/42.1; 428/343; 428/402.2; 428/402.24
(58) Field of Search ............... 428/40.1, 41.6, 428/42.1, 63, 343, 354, 402.2, 402.24

(56) References Cited

U.S. PATENT DOCUMENTS

| 3,640,791 | A | * | 2/1972 | Rosenheim ............... 156/230 |
| 5,075,149 | A | * | 12/1991 | Owens et al. ............. 428/138 |
| 5,254,192 | A | | 10/1993 | Speakman |
| 5,387,304 | A | * | 2/1995 | Berner et al. ............. 156/212 |
| 5,662,974 | A | | 9/1997 | Andrenacci et al. |
| 5,741,591 | A | * | 4/1998 | Tashiro et al. ......... 428/402.24 |

FOREIGN PATENT DOCUMENTS

| DE | 195 35 934 | 4/1997 |
| EP | 0361 351 | 4/1990 |
| JP | 05-245935 | 12/1993 |

OTHER PUBLICATIONS

"Microcapsule Processing and Technology", A. Kondo, pp. 18–21, 1979.*

* cited by examiner

Primary Examiner—Daniel Zirker
(74) Attorney, Agent, or Firm—Factor & Lake

(57) ABSTRACT

The present invention relates to a material for repairing damaged painted surfaces, wherein the material includes a paint layer which is capable of deformation and which is made of microcapsules held together by a binder. The paint is contained in the microcapsules in the form of paint droplets or powdered paint particles. The microcapsules and/or the binder are preferably made from a material that becomes tacky under the action of heat.

11 Claims, 1 Drawing Sheet

REPAIR MATERIAL FOR DAMAGED PAINTED SURFACES

Figure 1:
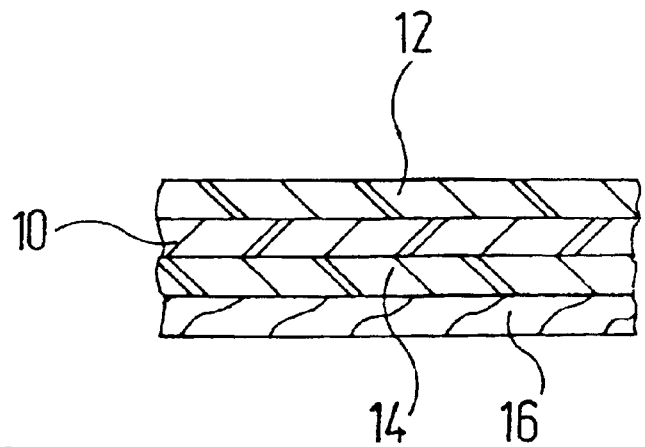

The invention relates to a repair material for repairing a layer of paint.

Minor paint damage is currently restored using repair kits which comprise, for example, a glass fibre stylus for the slight surface abrasion of the site to be repaired, and a paint stylus (small reservoir for paint with an integrated brush). Alternatively, use is made of spray cans.

The use of paint styluses has the disadvantage that a smooth junction with the paint surrounding the site of the repair is not obtained. Also, the repair area is often not reflectingly smooth. The utilisation of spray cans has the disadvantage that a veil of paint, which is likewise undesirable for aesthetic reasons, is often produced at the transitional region between the site of the repair and the adjacent paint.

The intention is to indicate, by means of the present invention, a material with the aid of which minor paint damage can be repaired in a simple and high-quality manner.

This object is achieved, according to the invention, by means of a repair material which is designed after the fashion of a patch.

The repair patch is Simply stuck on over the defective paint at the site to be restored and is then optionally heated up for hardening and/or for liquefying and subsequently solidifying the paint.

Since, in the repair material according to the invention, the paint material has not yet shrunk to form a brittle layer of paint, it can be successfully adapted even to convex surfaces.

Advantageous further developments of the invention are indicated in subclaims.

Layers of paint material, such as are indicated in the claims, can be produced in a particularly simple manner by applying liquid synthetic-resin paint to a substrate and surface drying the paint.

If the surface dried layer of paint remains, until utilised in service, on a deformable substrate, as is indicated in the claims, the repair material is distinguished by particularly satisfactory mechanical strength.

The further development of the invention according to the claims guarantees still greater deformability of the repair material, since a coherent layer of paint is not yet present in it at all. Nevertheless, the microcapsules guarantee homogeneous distribution of the paint material over the repair material, and such proximity of the individual small volumes of paint that the paint material runs together, when released and optionally heated up, and forms a smooth reflecting surface.

What is achieved with the aid of the invention in accordance with the claims is that, after that bonding of the paint material with the layer of paint to be repaired which takes place under the action of heat, only the paint material is left on the repair area.

If particles of powder paint are put into the microcapsules in accordance with the claims, in the first place the said particles form, after being melted down and cooled again, a layer of paint which is just as capable of being subjected to mechanical loads as the original paint. Furthermore, the paint bonds particularly well with the material lying underneath it.

A repair material such as is indicated in the claims needs no separate adhesive. It is also possible to simply lay the repair material on the repair area which has been heated up beforehand, where it is then fixed by the partial melting of the microcapsules.

The further development of the invention in accordance with the claims is of advantage with a view of the cost-effective manufacture of smaller pieces of repair material starting from large sheets or preferably webs of the said repair material.

What is achieved with the aid of the further development of the invention in accordance with the claims is that the user has available, in a ready-prepared manner, pieces of repair material of different geometry and different size, that is to say, does not have to cut the repair material himself. Cutting of the repair material by the user might lead to irregularities at the edges.

The further development of the invention in accordance with the claims permits adaptation of the colour of the repair material to paint which has become darker.

In that connection, the advantage is achieved, with the aid of the further development of the invention in accordance with the claims, that adaptation to the subsequent darkening can still be carried out the user.

This can be effected in a particularly simple manner in accordance with the claims, through the fact that the user picks out, from a plurality of grey layers, the one which matches best.

The grey layers may, for example, be grids with a different grid-point size, which are printed in a black colour onto a transparent layer. For those paints which become lighter as a result of atmospheric influences, use might also be made, in a similar manner, of "negative grey layers" manufactured by printing a grid pattern of reflective material onto a transparent layer. Alternatively, use might also be made of a white grid pattern for lightening purposes.

The further development of the invention in accordance with the claims makes it possible to keep a supply of only a single kit of repair material, with the aid of which it is then possible to cover a manufacture's entire range of colours (optionally for a certain model only). This facilitates stock-keeping, particularly at the final vendor's premises.

Figure 2:
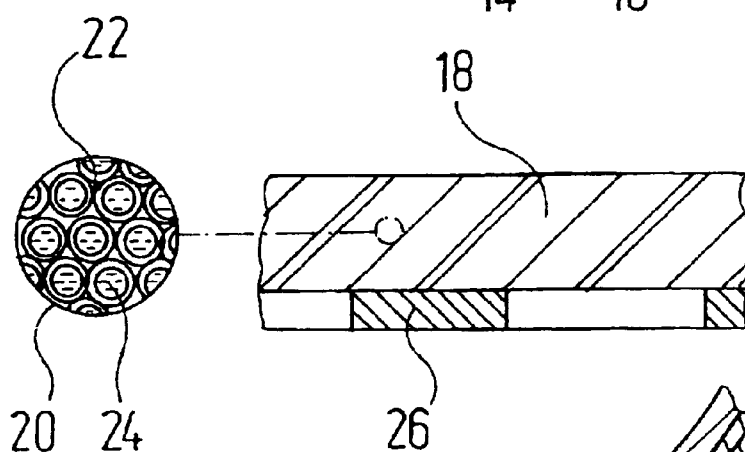
Figure 3:
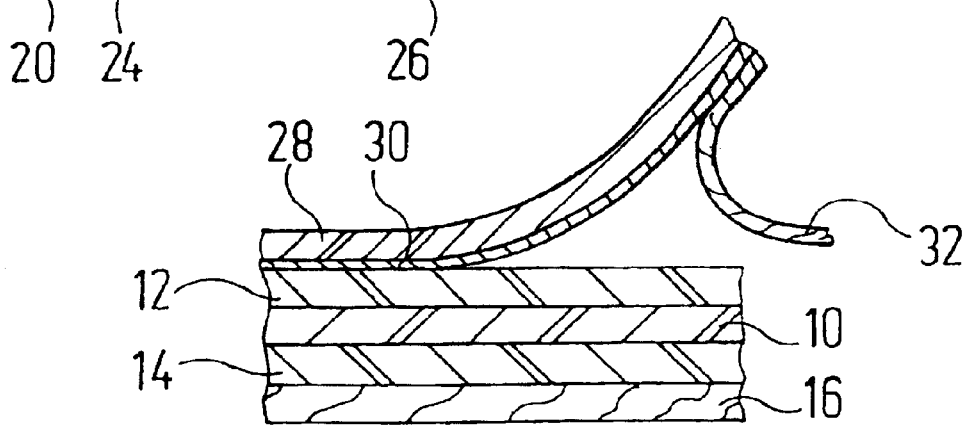
Figure 4:
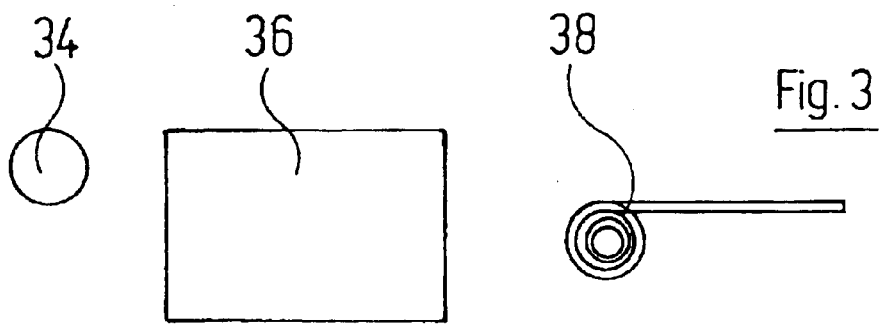

The invention will be explained in greater detail below with the aid of two exemplified embodiments and with reference to the drawings, in which:

FIG. 1: shows a section through a first repair material for layers of paint, in a direction perpendicular to the plane of the material;

FIG. 2: shows a view which is similar to that in FIG. 1 but in which a modified repair material is represented;

FIG. 3: shows a view which is similar to that in FIG. 1 and in which the repair material is additionally provided with a grey layer, in order to restore weathered paint; and FIG. 4: shows a top view of pieces of repair material of different cut, which are contained in a kit in order to be able to carry out the restoration of painted regions of different shapes.

The repair material represented in FIG. 1 for a scratched or otherwise damaged layer of paint comprises a central base layer 10 which is manufactured from a flexible plastic material, for example a polypropylene film with a layer thickness of about 20 to 50 $\mu$m.

A layer of paint 12 is applied to the upper side of the base layer, for example by the spraying-on of a solvent-based paint and the subsequent drying-off of the said layer of paint. However, the paint is not hardened, with the result that it remains flexible and plastically deformable, in a manner similar to a prepreg.

The underside of the layer of paint 12 carries a layer of adhesive 14 with the aid of which the repair material can be attached to that painted area of a motor vehicle, sheet-metal casing or the like, which is to be repaired. Before the material is used, the layer of adhesive 14 is masked by a protective layer 16 which can be pulled off.

The modified repair material according to FIG. 2 consists of a layer 18 which, in turn, consists of microcapsules 20 and a bonding agent 22 which holds the latter together. Contained inside the microcapsules 20 is a paint material 24 which, in this case, is shown as small droplets of paint but which may also be constituted by a small volume of powder-paint particles.

Islands of adhesive 26 are provided on the underside of the layer 18 in a regularly distributed manner.

The islands of adhesive 26, the bonding agent 22 and the walls of the microcapsules 20 are, in each case, manufactured from a material which evaporates and/or decomposes when acted upon by heat.

The way in which the repair material according to FIG. 2 is used, is that it is first applied to the area to be repaired and is smoothed down on the said repair area.

The islands of adhesive 26, the bonding agent 22 and the walls of the microcapsules 20 are then evaporated by supplying heat, and the contents of the various microcapsules 20 coalesce on the repair area to form a layer of paint. The said layer of paint can then be hardened in the usual way by means of infrared radiation.

If a material which becomes sticky when heated up is chosen as the bonding agent 22 and/or as the material for the wall of the microcapsules 20, it is possible to dispense with the islands of adhesive 26. In this case, the repair material is simply laid on the repair area which has been heated up beforehand, and is attached when partial melting of the bonding agent and/or of the microcapsules occurs. With a further increase in temperature, these materials are then evaporated and the paint material comes into contact with the repair area. In the case of powder paint, further heating of the site of the repair leads to the melting-down of the powder-paint particles, which thus coalesce to form a coherent layer and are intimately bonded to the support.

The repair material shown in FIG. 3 is intended for restoring weathered paint. For this purpose, the repair material additionally comprises a grey layer 28 which accompanies a piece of repair material as a separate piece of repair material. The repair kit comprises grey layers 28 having different grey values, so as to be able to restore paint which has been darkened to different degrees.

The grey layer 28 carries, on its underside, a transparent layer of adhesive 30 which is masked by a protective layer 32 which is likewise transparent. In this way, the user can lay grey layers having different grey values over the repair material on a trial basis, and decide which grey layer best reproduces the subsequent darkening which has occurred in the layer of paint.

After pulling off the protective layer 32, the user then sticks that grey layer 28 which produces the best match with the weathered paint, optically speaking, onto the upper side of the repair material, as is indicated in the left-hand part of FIG. 3. After its protective layer 16 has been pulled off, the repair material, which is thus adapted to the specific requirements, is stuck onto the painted region to be restored.

In practice, different restoring operations can be carried out on car paintwork or other paintwork. Thus, it may be necessary, on the paintwork of a car, to make good a long scratch produced with a sharp object, or else merely a small spot-shaped site which has been brought about by rust or the impact of a stone. It is accordingly possible, as illustrated in FIG. 4, to make available a repair kit which comprises small, round pieces of repair material 34, rectangular pieces of repair material 36 and long, strip-shaped pieces of repair material 38, the latter being rolled up in the kit to form small coils.

In yet another further development of the invention, it is possible to market kits of pieces of repair material which not only comprise pieces of material of different geometry but also cover a manufacturer's entire standard range of colours for a certain type of motor car. This simplifies. stock-keeping.

It will be recognised that it is possible, in the manner described above, to repair defective sites in layers of paint in a simple way, without there being the risk of impairing the region surrounding the site of the repair. A reflective and satisfactorily adhering layer of paint is obtained at the site of the repair itself.

What is claimed is:

1. A repair material for a layer of paint, comprising:
   a deformable microcapsule layer having a plurality of microcapsules bound together with a binding agent, wherein the microcapsules comprise a decomposable wall material, which encompasses powdered paint particles therein; and
   an adhesive layer associated with the deformable microcapsule layer;
   wherein the decomposable wall material of the microcapsules and the binding agent decompose upon application of heat.

2. The repair material according to claim 1, further comprising a deformable base material adhered to the deformable microcapsule layer.

3. The repair material according to claim 1, wherein the adhesive layer comprises the same layer as the microcapsule layer, such that the repair material becomes adhesive upon application of heat.

4. The repair material according to claim 1, wherein the repair material comprises a repair patch having a predetermined geometry.

5. The repair material according to claim 1, wherein the repair material comprises at least one coloured layer.

6. The repair material according to claim 5, wherein the coloured layer is a separate piece of material from the deformable microcapsule layer, the coloured layer additionally including a layer of adhesive via which it can be attached to the deformable microcapsule layer.

7. The repair material according to claim 1, wherein the repair material comprises at least one grey-coloured layer.

8. The repair material according to claim 7, wherein the grey-coloured layer is a separate piece of material from the deformable microcapsule layer, the grey-coloured layer additionally including a layer of adhesive via which it can be attached to the deformable microcapsule layer.

9. A kit for repairing a layer of paint, comprising two or more repair patches according to claim 1, wherein each of the repair patches comprises a predetermined geometry.

10. A kit for repairing a layer of paint, comprising two or more grey-coloured layer pieces according to claim 8, with each grey-coloured layer piece having a different grey value.

11. A kit for repairing a layer of paint, comprising two or more coloured layer pieces according to claim 6, with each coloured layer piece having a different colour.

* * * * *